(12) United States Patent
Nidaira et al.

(10) Patent No.: US 8,934,031 B2
(45) Date of Patent: Jan. 13, 2015

(54) LIGHT INTENSITY CONTROL DEVICE, IMAGING DEVICE AND LIGHT INTENSITY CONTROL METHOD

(75) Inventors: Fumio Nidaira, Chigasaki (JP); Yasufumi Nakaaki, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 469 days.

(21) Appl. No.: 13/318,026

(22) PCT Filed: Apr. 28, 2010

(86) PCT No.: PCT/JP2010/057547
§ 371 (c)(1),
(2), (4) Date: Oct. 28, 2011

(87) PCT Pub. No.: WO2010/126079
PCT Pub. Date: Nov. 4, 2010

(65) Prior Publication Data
US 2012/0050605 A1 Mar. 1, 2012

(30) Foreign Application Priority Data

Apr. 30, 2009 (JP) ................ P2009-110836

(51) Int. Cl.
| | | |
|---|---|---|
| H04N 5/235 | (2006.01) | |
| G03B 9/02 | (2006.01) | |
| G02B 5/00 | (2006.01) | |
| G03B 7/08 | (2014.01) | |
| G03B 11/00 | (2006.01) | |
| H04N 5/225 | (2006.01) | |
| H04N 5/238 | (2006.01) | |
| H04N 101/00 | (2006.01) | |

(52) U.S. Cl.
CPC *G03B 9/02* (2013.01); *G02B 5/005* (2013.01); *G03B 7/08* (2013.01); *G03B 11/00* (2013.01); *H04N 5/2254* (2013.01); *H04N 5/238* (2013.01); *H04N 2101/00* (2013.01)
USPC ........ 348/229.1; 348/362; 348/363; 348/364; 348/365

(58) Field of Classification Search
USPC ................................................ 348/362–388
See application file for complete search history.

(56) References Cited

U.S. PATENT DOCUMENTS

| | | |
|---|---|---|
| 5,293,542 A | 3/1994 | Ise et al. |
| 2004/0130653 A1 | 7/2004 | Nanjo et al. |

(Continued)

FOREIGN PATENT DOCUMENTS

| | | |
|---|---|---|
| CN | 1442707 A | 9/2003 |
| CN | 1462904 A | 12/2003 |

(Continued)

OTHER PUBLICATIONS

Office Action from counter-part Korean Intellectual Property Office mailed on Jan. 25, 2013.

(Continued)

*Primary Examiner* — Roberto Velez
*Assistant Examiner* — Yih-Sien Kao
(74) *Attorney, Agent, or Firm* — Nath, Goldberg & Meyer; Jerald L. Meyer; Leonid D. Thenor

(57) ABSTRACT

A light intensity control device includes a fixed opening 261, an aperture stop part 26 for controlling a light flux of incident light, a light intensity aperture part 24 for changing the size of an opening by moving a plurality of aperture blades to limit a light intensity of transmitted light and a ND filter 25 having a transparent area 253 and a light blocking area 254, which is arranged to be movable between a first light blocking state where the transparent area 253 faces the fixed opening 261 of the aperture stop part 26 and a second light blocking state where the light blocking area 254 faces the fixed opening. The moving of the ND filter 25 is carried out when the opening area of the light intensity aperture part 24 is a maximum.

4 Claims, 9 Drawing Sheets

(56) References Cited

U.S. PATENT DOCUMENTS

2004/0135921 A1 7/2004 Murata et al.
2008/0037092 A1* 2/2008 Umezu et al. .................. 359/227

FOREIGN PATENT DOCUMENTS

| | | | | |
|---|---|---|---|---|
| EP | 1848202 A2 | 10/2007 | | |
| JP | 05281592 | 10/1993 | | |
| JP | 6-265971 A | 9/1994 | | |
| JP | 06265971 A | * 9/1994 | ............... | G03B 9/02 |
| JP | 10-133254 A | 5/1998 | | |
| JP | 11-64921 A | 3/1999 | | |
| JP | 2000-106649 A | 4/2000 | | |
| JP | 2000-111970 A | 4/2000 | | |
| JP | 2000-147589 A | 5/2000 | | |
| JP | 2001-174862 A | 6/2001 | | |
| JP | 2003-121900 A | 4/2003 | | |
| JP | 2003121900 A | * 4/2003 | ............... | G03B 9/02 |
| JP | 2003-255433 A | 9/2003 | | |
| JP | 2004020711 A | 1/2004 | | |
| JP | 2004-205951 A | 7/2004 | | |
| JP | 2007-292828 A | 11/2007 | | |

OTHER PUBLICATIONS

Official Action, State Intellectual Property Office, Application No. 201080019019.0, issued on Oct. 23, 2013, five (5) pages.
European Patent Office, Supplementary European Search Report, dated 8 Nov. 2012 (Published Nov. 19, 2012).

* cited by examiner

LIGHT INTENSITY CONTROL DEVICE, IMAGING DEVICE AND LIGHT INTENSITY CONTROL METHOD

TECHNICAL FIELD

The present invention relates to a light intensity control device for accomplishing correct exposure in an imaging device, and also relates to the imaging device and a method of controlling light intensity.

BACKGROUND ARTS

In imaging devices, such as video camera and digital still camera, it is performed to step down the aperture of lens smaller for correct exposure (referred to as "aperture step-down" hereinafter). This aperture step-down is accompanied with two problems. First, under condition of the aperture step-down, dusts and scratches on a cover glass of a package of a pickup device and an optical low-pass filter are imaged in the form of shadows on a resultant taken image. Second, the diffractive influence of narrowed aperture on the image formation by pickup lens becomes increased.

In order to solve these problems, a light-intensity step-down device having an aperture mechanism and a ND (Neutral Density) filter is described in Patent Document No. 1. Patent Document No. 1 describes as follows, in general. The light-intensity step-down device includes a plurality of aperture blades for changing the size of an aperture opening and a ND filter disposed in an opening defined by the aperture blades and furthermore, the ND filter and the aperture blades are formed by different members, respectively. Thus, it is said that the disclosed light-intensity step-down device is capable of controlling the light intensity with high accuracy.

PRIOR ART DOCUMENTS

Patent Documents

Patent Document No. 1:
Japanese Patent Publication Laid-open No. 10-133254

SUMMARY OF THE INVENTION

Problems to be Solved

In the technique described in Patent Document No. 1, the light intensity can be controlled effectively by using not only the aperture blades but also the ND filter. However, the diffractive influence of narrowed aperture is not improved sufficiently. In addition, there is a possibility that the using of a ND filter causes light transmitted through the light-intensity step-down device to be increased in its wave aberration.

Therefore, an object of the present invention is to provide a light intensity control device, an imaging device and a light intensity control method, all of which allow the intensity of light incident on a pickup device to be controlled with ease and reduce both diffractive influence at the aperture opening and wave aberration in spite of using the ND filter.

Solutions to the Problems

In order to achieve the above objects, the present invention provides the following constitutions (1) to (3) and control methods (4) and (5).

1) A light intensity control device comprising: an aperture stop part 26 provided with a fixed opening 261 having a predetermined size of first opening area thereby controlling a light flux of incident light to the predetermined size; a light extinction part 25 having a first area 253 whose transmissivity for the incident light is more than a first value and a second area 254 whose transmissivity for the incident light is a second value smaller than the first value, the light extinction part being adapted to be movable between its first light blocking state where the first area 253 covers the opening part completely and a second light blocking state where the second area 254 covers the opening part completely; and a light intensity aperture part 24 having a plurality of movable aperture blades to further limit a light intensity of light transmitted through the opening part by moving the plurality of aperture blades so that the size of an opening defined by the plurality of aperture blades against the opening part is changed from the first opening area to a second opening area smaller than the first opening area, wherein the moving of the light extinction part 25 and the moving of the plurality of aperture blades are carried out independently of each other.

2) The light intensity control device 23 of (1), wherein a phase difference of transmission wavefront between light transmitted through the first area 253 and light transmitted through the second area 254 is less than 0.2 μm with a wavelength of 0.55 μm.

3) An imaging device 1 comprising: a pickup device 3 for converting incident light to an electrical signal when light corresponding to a subject image enters the pickup device thereby outputting the electrical signal as a detection signal; a lens part 2 consisting of a plurality of lenses to form the subject image on the pickup device; a light intensity control device 23 of (1) or (2) interposed in the plurality of lenses of the lens part; and a control unit 4 for controlling the light extinction part 25 and the light intensity aperture part 24 of the light intensity control device 23 independently of each other, based on the detection signal outputted from the pickup device 3.

4) A light intensity control method comprising: a light extinction position detecting step of moving a light extinction part 25 including a light blocking area 254 having a predetermined transmissivity in a direction to allow the light blocking area 254 to cover an opening area in an aperture stop part 26 completely, thereby limiting light intensity of light transmitted through the opening part; and an aperture blade moving step of moving a plurality of aperture blades under condition that the opening part is covered with the light blocking area 254 completely so as to change the size of an opening against the opening part from the first opening area to a second opening area smaller than the first opening area, thereby further limiting the light intensity of the light transmitted through the opening part.

Effects of the Invention

According to the present invention, it is possible to control the light intensity of light incident on a pickup device easily, reduce the influence of diffraction at an aperture opening and also reduce wave aberration in spite of using a ND filter.

EMBODIMENTS OF THE INVENTION

Figure 1:
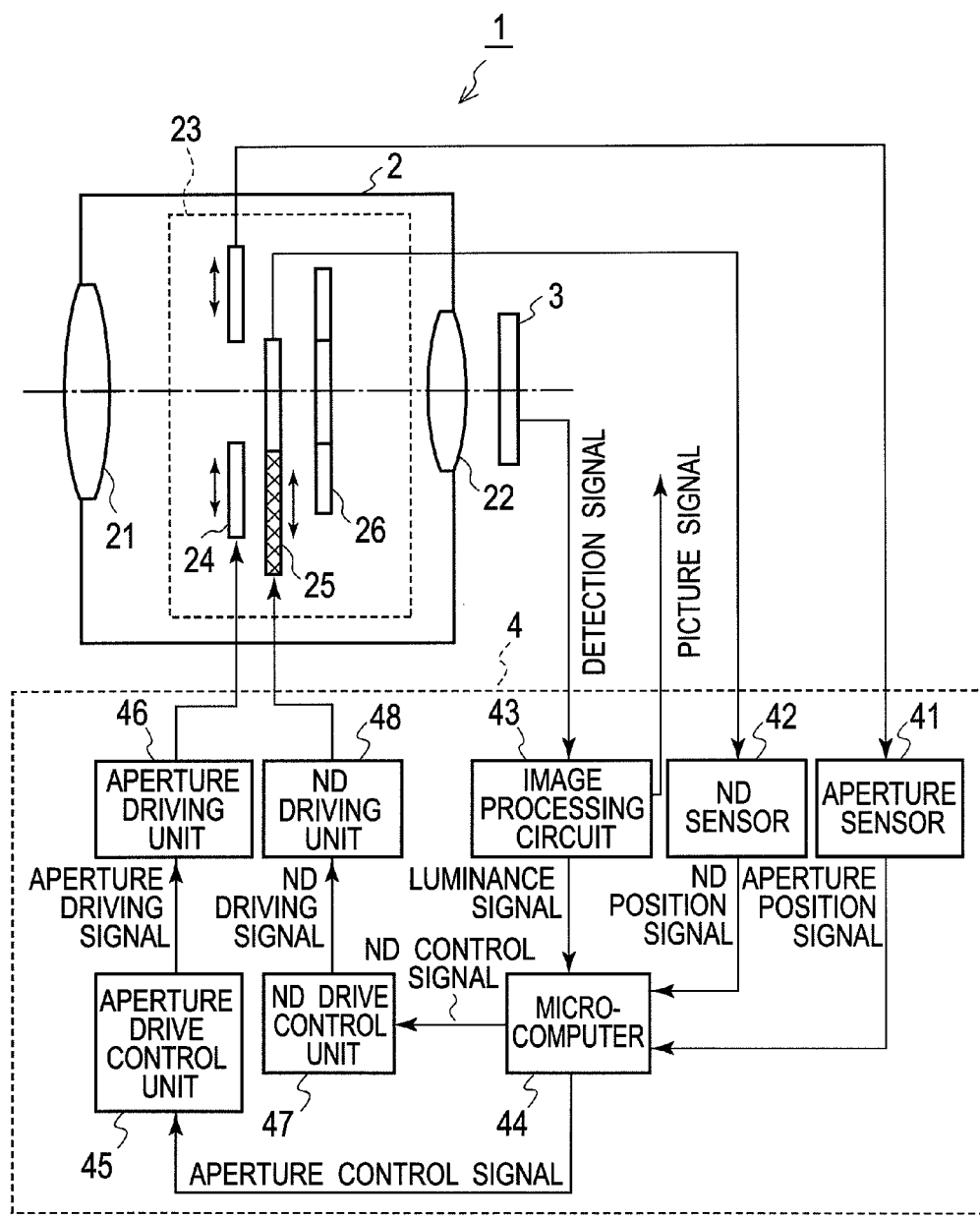
FIG. 1 is a constitutive diagram showing an imaging device in accordance with an embodiment of the present invention.

Referring to drawings, an embodiment of a light intensity control device and its control method related to the present invention will be described below. Note that throughout all drawings, components having common functions are indicated with the same reference numerals, respectively. Once describing of an element is done, its overlapping descriptions will be eliminated after. In addition, illustrated sectional views, schematic views, etc. are nothing but exemplary diagrams and their dimensional ratios may be represented with exaggeration.

FIG. 1 shows the constitution of an imaging device, such as video camera and digital still camera, to be employed in this embodiment.

The imaging device 1 includes a lens part 2 consisting of a plurality of lens units to provide a subject image at a prescribed position and also control the light intensity of incident light, a pickup device 3 arranged in an imaging position of the subject image and a control unit 4 that generates output signals from the pickup device 3 and also controls the lens part 2 thereby controlling its zooming, focusing and a light intensity.

Assuming here that the pickup device is arranged on the rear side of the imaging device while the subject is positioned on the front side, the embodiment will be described below.

The lens part 2 comprises a first lens unit 21 arranged closest to the subject, a second lens unit 22 arranged closest to the pickup device and a light intensity control device 23 arranged between the first lens unit 21 and the second lens unit 22.

Here, there are neither illustrated nor described zoom lens unit, focus lens unit, etc. that are not related to the present invention directly.

The light intensity control device 23 includes a light intensity aperture part 24 changing the size of an opening part to control the light intensity and a neutral density (ND) filter (light extinction part) 25 having a predetermined value in transmittance and an aperture stop part 26 having a fixed opening of a predetermined size and controlling the size of an incident flux by the opening.

Here, the light intensity aperture part 24, the ND filter 25 and the aperture stop part 26 are arranged close to each other in the direction of optical axis.

Figure 2:
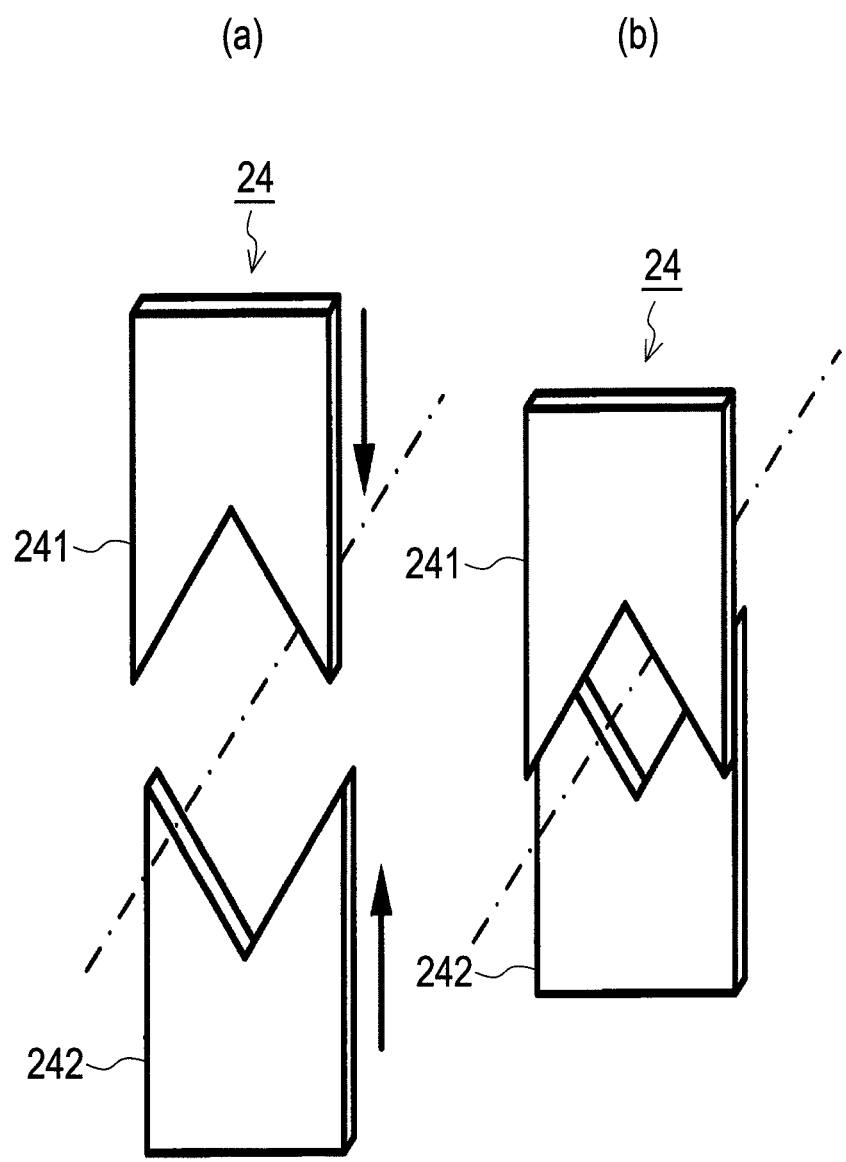
FIG. 2 is a perspective view of a light-intensity step-down part 24 of the embodiment of the present invention, in which FIG. 2(*a*) shows an opened state of an aperture and FIG. 2(*b*) shows a closed state of the aperture.

The details of the light intensity aperture part 24 will be described with reference to FIG. 2. FIG. 2 is a perspective view of the light intensity aperture part 24, in which FIG. 2(a) shows the aperture in its opened state, while FIG. 2(b) shows the aperture in the closed state.

As shown in FIGS. 2(a) and 2(b), the light intensity aperture part 24 includes a first aperture blade 241 and a second aperture blade 242.

The first aperture blade 241 and the second aperture blade 242 are opposed to each other through the optical axis and also shifted from each other in the direction of optical axis so as to allow the aperture to be closed up. In the first aperture blade 241 and the second aperture blade 242, additionally, their surfaces perpendicular to the optical axis are cut away so that their edges interposing the optical axis therebetween are gradually apart from each other as departing from their center portions as the center. Owing to the formation, therefore, a substantially rhombic opening is formed when the blades are moved so as to close up an aperture therebetween [FIG. 2(b)].

In FIG. 2(a), as the first aperture blade 241 and the second aperture blade 242 are moved in the directions of arrows respectively, the substantially rhombic opening is defined as shown in FIG. 2(b).

For instance, the first aperture blade 241 and the second aperture blade 242 are made from a polyester sheet having a thickness of 0.05 mm in black and provided with V-shaped notches each having an open angle of 90 degrees. Consequently, a square-shaped opening could be defined by arranging these blades in a manner that their V-shaped notches face each other.

From an initial state where a square-shaped opening has been formed by the first aperture blade 241 and the second aperture blade 242, additionally, it is possible to continuously vary the size of the opening by linearly moving them in opposite directions to each other by equal distances.

As for the shapes of the aperture blades, not limited to the above-mentioned structure only, any shapes would be acceptable as long as they can be moved to obstruct the light flux.

Although the light intensity aperture part 24 comprises two sheets of aperture blades 241, 242 in this embodiment, there is no limitation in the number of aperture blades as long as they are movable to obstruct the light flux.

Figure 3:
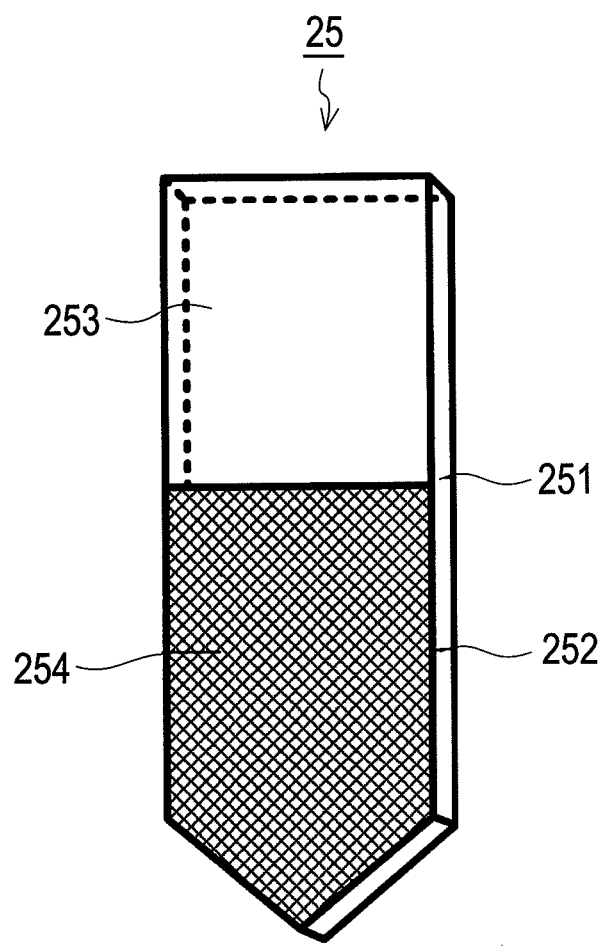
FIG. 3 is a perspective view showing the details of a ND filter 25 in accordance with the embodiment of the present invention.

The details of the ND filter 25 will be described with reference to FIG. 3. FIG. 3 is a perspective view showing the details of the ND filter 25.

In the ND filter 25, there are a type of filter where light-absorbing material is dispersed in a transparent substrate and another type of filter where a membrane is deposited on a transparent substrate (membrane-type ND filter). In the membrane-type ND filter, further, there are a reflection type filter using a metal film and an absorption type filter using a dielectric film. Here, the ND filter 25 using a dielectric film will be described.

As shown in FIG. 3, the ND filter 25 has a light blocking film 252 composed of a dielectric film, which is formed on part of a surface of a transparent substrate 251 made of glass, plastic material or the like. Here, an area having the light blocking film 252 formed thereon will be referred to as "light extinction area 254". The light blocking film 252 of the light extinction area 254 is designed so as to absorb part of light in the band of visible light out of the incident light and exhibit a predetermined transmissivity in the band of visible light. Preferably, the transmissivity becomes less than 30%, which will be described later.

In the ND filter 25, only an antireflection film is formed on a transparent area 253 on which the light blocking film 252 is not formed. In the transparent area 253, the transmissivity for light in the band of visible light is approximately 98%. Again, the transparent area 253 is shaped to be larger than the opening part of the aperture stop part 26. In addition, the light extinction area 254 is also shaped to be larger than the opening part of the aperture stop part 26.

Note that the ND filter 25 and the light intensity aperture part 24 are driven by not-shown actuators to effect controlling of light intensity.

The aperture stop part 26 includes a circular hole (fixed opening) 261 that maintains a circular light flux when the first aperture blade 241 and the second aperture blade 242 of the light intensity aperture part 24 are brought into the opened state. The diameter of the circular hole is established corresponding to the maximum aperture F-value of the lens part 2.

Returning to FIG. 1, the constitution of the imaging device 1 will be described.

The pickup device 3, which is a type of photoelectric conversion element, converts light into electrical energy. CCD (Charge Coupled Device) or CMOS (Complementary Metal Oxide Semiconductor) may be used for the pickup device.

The control unit 4 includes an aperture sensor 41, a ND sensor 42, an image processing circuit 43, a microcomputer 44, an aperture control circuit 45, an aperture driving unit 46, a ND control circuit 47 and a ND driving unit 48.

The aperture sensor 41 detects the positions (in the open state) of respective aperture blades (241, 242 of FIG. 2) of the light intensity aperture part 24 and outputs an aperture position signal to the microcomputer 44.

The ND sensor 42 detects the position (inserted state) of the ND filter 25 and outputs ND position signals to the microcomputer 44.

The image processing circuit 43 inputs a detection signal outputted as a result of photoelectric conversion at the pickup device 3 and carries out signal processing based on the inputted detection signal. Then, the image processing circuit outputs resultant picture signals to the outside and also outputs a luminance signal to the microcomputer 44.

Based on the luminance signal, the aperture position signal and the ND position signal all inputted, the microcomputer 44 output an aperture control signal and a ND control signal for controlling the light intensity aperture part 24 and the ND filter 25 respectively so as to accomplish a predetermined luminance.

Based on the aperture control signal from the microcomputer 44, the aperture drive control circuit 45 outputs the aperture drive signal for driving the respective aperture blades (241, 242 of FIG. 2) of the light intensity aperture part 24.

An aperture driving unit 46 drives the respective aperture blades (241, 242 of FIG. 2) of the light intensity aperture part 24 based on the aperture drive signal to control the amount of opening.

The ND control circuit 47 outputs a ND driving signal for driving the ND filter 25 based on the ND control signal from the microcomputer 47.

The ND driving unit 48 drives the ND filter 25 based on the ND driving signal to limit the amount of insertion.

Next, the operation of the imaging device 1 will be described.

When directing the imaging device 1 toward the subject, a subject image is formed on the pickup device 3 owing to the focusing function of the lens part 2.

Based on the detection signal outputted from the pickup device when the subject image is formed on the pickup device, the picture signals and the luminance signal are produced and outputted by the image processing circuit 43.

The luminance signal outputted from the image processing circuit 43 is inputted by the microcomputer 44. In the microcomputer 44, the luminance level at the time of imaging the subject, which can be obtained by the inputted luminance signal, is compared with a preset luminance level, calculating a luminance difference therebetween.

To the microcomputer 44, furthermore, there are inputted respective positions (first aperture positions) of the aperture blades 241, 242 of the light intensity aperture part 24 and an inserting position (first inserting position) of the ND filter 25 at the time of imaging the subject.

From the first aperture positions and the first inserting position inputted to the microcomputer 44 and the luminance difference, the microcomputer 44 calculates respective positions (second aperture positions) of the respective aperture blades 241, 242 and an inserting position (second inserting position) of the ND filter in order to attain a preset luminance level and further outputs an aperture control signal and a ND control in order to attain the so-obtained second aperture positions and the second inserting position.

The aperture drive control circuit 45 outputs an aperture driving signal based on the aperture control signal and also drives the aperture driving unit 46 to change the positions (first aperture positions) of the respective aperture blades 241, 242 to the calculated positions (second aperture positions).

The ND control circuit 47 outputs a ND driving signal for driving the ND filter 25 based on the ND control signal from the microcomputer 47 and also drives the ND driving unit 48 to change the inserting position (first aperture position) of the ND filter 25 to the calculated interesting position (second inserting position).

Figure 4:
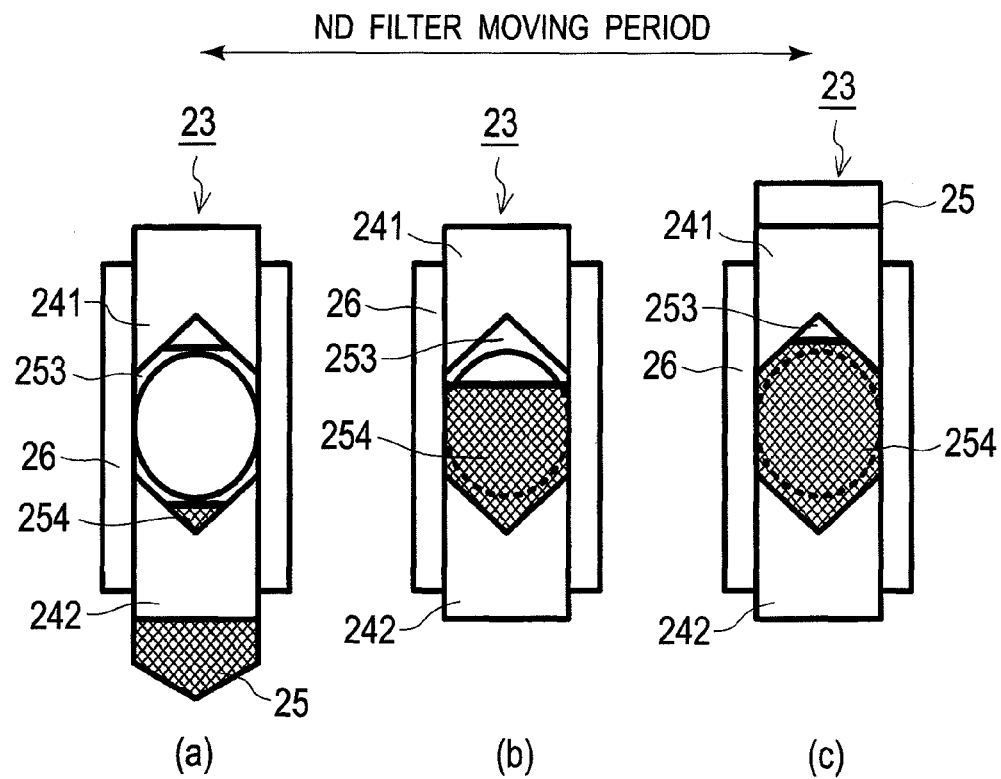
FIG. 4 is a front view showing an aperture part of light intensity and the operation of the ND filter in the light intensity control device of the embodiment of the present invention.
Figure 4:
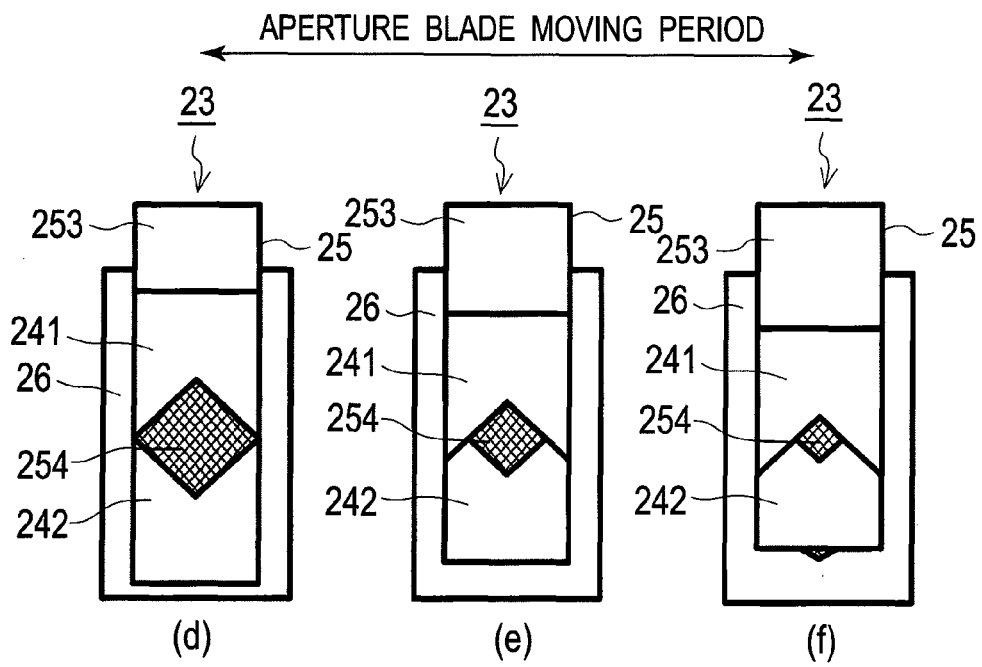
Figure 5:
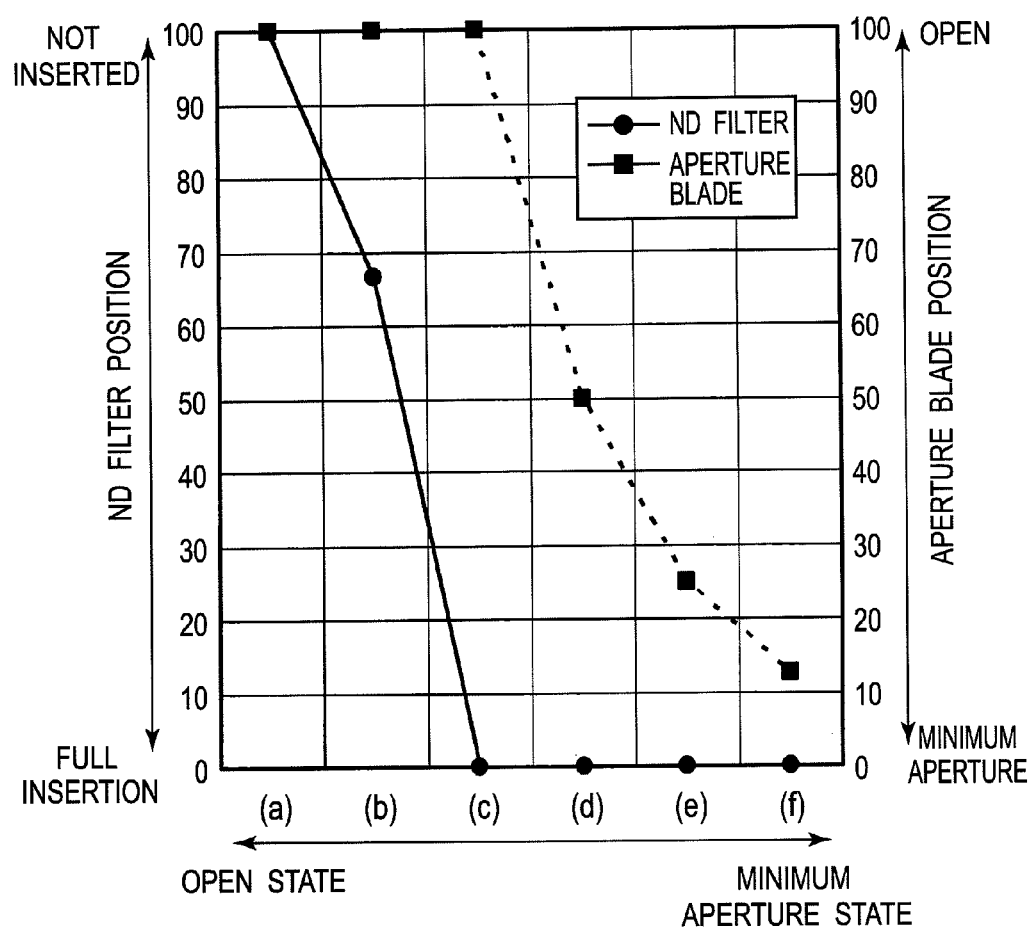
FIG. 5 is a graph showing the operational condition of the aperture part of light intensity and the ND filter in the light intensity control device of the embodiment of the present invention.
Figure 6:
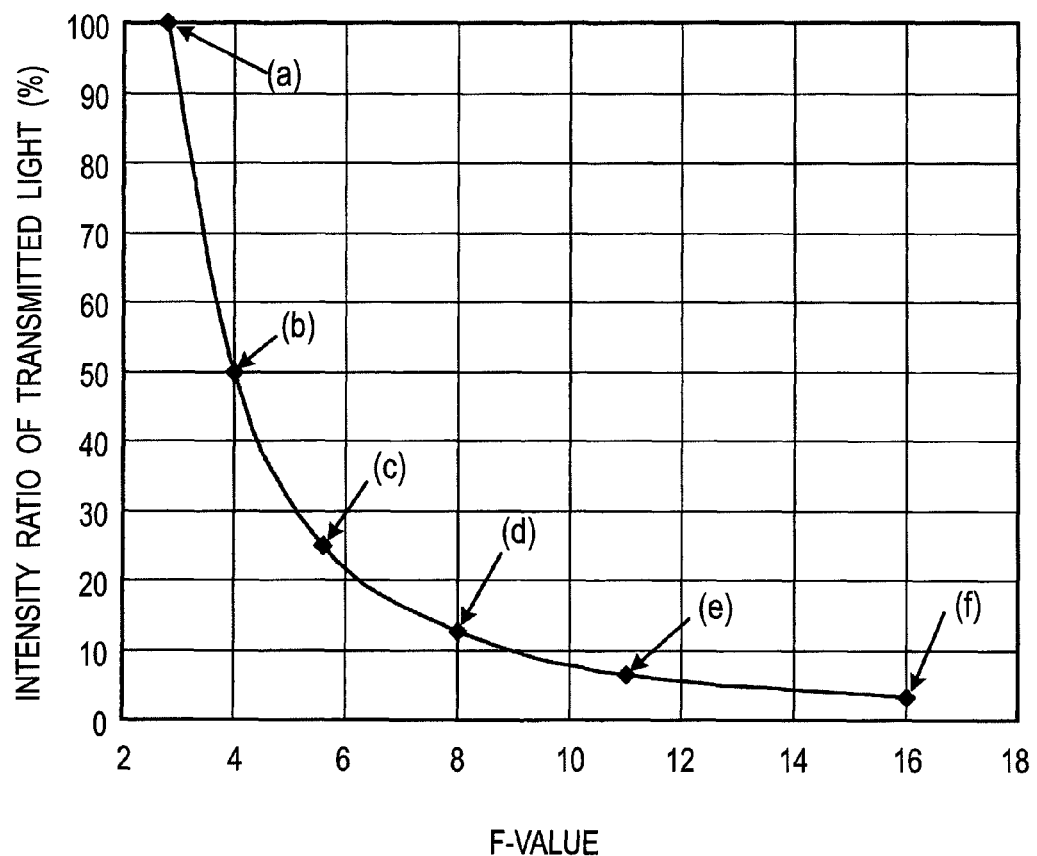
FIG. 6 is a graph showing a relationship between F-values and intensity ratios of transmitted light in the light intensity control device of the embodiment of the present invention.

Next, the operation of the light intensity control device in the embodiment of the present invention will be described with reference to FIGS. 4 to 6, in detail. FIG. 4 is a front view of the light intensity control device 23 viewed from the side of the first lens unit 23, showing the operations of the light intensity aperture part 24 and the ND filter 25. FIG. 5 is a graph showing the operations of the light intensity aperture part 24 and the ND filter 25 under condition that the maximum aperture F-value is set to 2.8 with use of the ND filter 25 with the light blocking area 254 whose transmitted light intensity ratio is 25% while that of the opened state is set to 100% (by the transparent area 253). FIG. 6 is a view showing the relationship between F-value and the transmitted light intensity ratio under condition that the maximum aperture F-value is set to 2.8 with use of the ND filter 25 with the light blocking area 254 whose transmitted light intensity ratio is 25% while that of the opened state is set to 100% (by the transparent area 253).

Referring to FIG. 6, the operations of the light intensity aperture part 24 and the ND filter 25 in the light intensity control device 23 changing from its opened state (a) to the minimum aperture state (f) will be described in sequence.

First, in the opened state (a), the transparent area 253 of the ND filter 25 covers the fixed opening 261 of the aperture stop part 26 while the first aperture blade 241 and the second aperture blade 242 are in their opened state (i.e. in the furthest state from each other). Then, the F-value becomes F2.8 on the establishment that the transmitted light intensity ratio is 100%.

Then, in order to change the transmitted light intensity ratio of the light intensity control device 23 from (a) 100% to (b) 50%, the ND filter 25 is moved so that the light blocking area 254 covers 66.7% of the fixed opening 261 while remaining the first aperture blade 241 and the second aperture blade 242 in the opened state (i.e. in the furthest state from each other). Then, the F-value varies from 2.8 to 4.0.

In order to change the transmitted light intensity ratio of the light intensity control device 23 from (b) 50% to (c) 25%, the ND filter 25 is further moved so that the light blocking area 254 covers the overall of the fixed opening 261 while remaining the first aperture blade 241 and the second aperture blade 242 in the opened state (i.e. in the furthest state from each other). Then, the F-value varies from 4.0 to 5.6.

In order to change the transmitted light intensity ratio of the light intensity control device 23 from (b) 25% to (c) 12.5%, the first aperture blade 241 and the second aperture blade 242 are moved so that they cover 50% of the fixed opening 261 while the light blocking area 254 of the ND filter 25 is covering the whole of the fixed opening 261. Then, the F-value varies from 5.6 to 8.0.

In order to change the transmitted light intensity ratio of the light intensity control device 23 from (d) 12.5% to (e) 6.3%, the first aperture blade 241 and the second aperture blade 242 are further moved so that they cover 75% of the fixed opening 261 while the light blocking area 254 of the ND filter 25 is covering the whole of the fixed opening 261. Then, the F-value varies from 8.0 to 11.

In order to change the transmitted light intensity ratio of the light intensity control device 23 from (d) 6.3% to (e) 3.1%, the first aperture blade 241 and the second aperture blade 242 are further moved so that they cover 87.5% of the fixed opening 261 while the light blocking area 254 of the ND filter 25 is covering the whole of the fixed opening 261. Then, the F-value varies from 11 to 16.

Hereinafter, the condition from one state (a) with 100% in the transmitted light intensity ratio to the other state (c) with 25% in the transmitted light intensity ratio will be referred to as "ND filter moving period". Similarly, the condition from one state (d) with 25% in the transmitted light intensity ratio to the other state (f) with 3.1% in the transmitted light intensity ratio will be referred to as "aperture blade moving period".

Next, when the light blocking area 254 of the ND filter 25 covers the fixed opening 261 partially as in the ND filter moving period, there is produced a phase difference in the transmitted wavefront (namely, transmitted wavefront phase difference) since the light beam transmitted through the transparent area 253 differs from the light beam transmitted through the light blocking area 254 in term of an optical path length (the product of the film thickness of a dielectric film forming the light blocking area 254 by its refraction index). This transmitted wavefront phase difference causes a deterioration in resolution of a shooting image formed on the pickup device. For this reason, it is necessary to restrain the deterioration in resolution, as possible.

Figure 7:
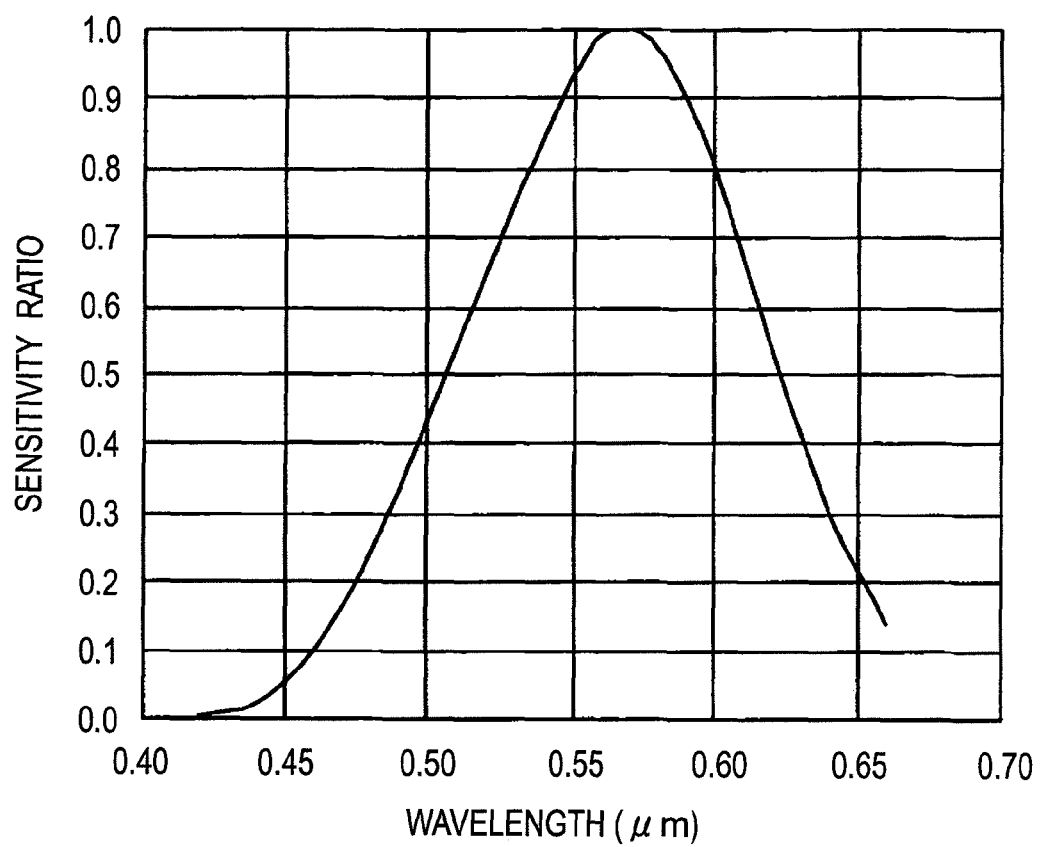
FIG. 7 is a graph showing a visibility curve of human eyes.

In the ND filter moving period, the influence of a transmitted wavefront phase difference between the light transmitted through the transparent area 253 and the light transmitted through the light blocking area 254 on the resolution will be confirmed. At respective aperture conditions of F2.8, F4 and F5.6 upon inserting the ND filter 25 with 25% in transmissivity and further changing the aperture at intervals of 0.5 AV (Aperture Value), we simulated respective values of MTF (Modulation Transfer Function) in case of changing the transmitted wavefront phase difference from 0 to 0.4 µm every 0.1 µm. The simulation has been performed by inserting the ND filter 25 causing respective phase differences into an entrance pupil of an ideal aberration-free lens. Note that the weighting of light beams in calculating MTF has been generally established according to visibility characteristics. The human eye is sentient of lights of wavelengths from approx. 380 nm to 780 nm and the sensitivity of eye for light changes depending on the wavelength of light. Therefore, this sensation of eye by wavelength will be referred to as "visibility" and further represented by a curve shown in FIG. 7. As shown in FIG. 7, the human eye has a maximum sensitivity at approx. 550 nm in wavelength.

Figure 8:
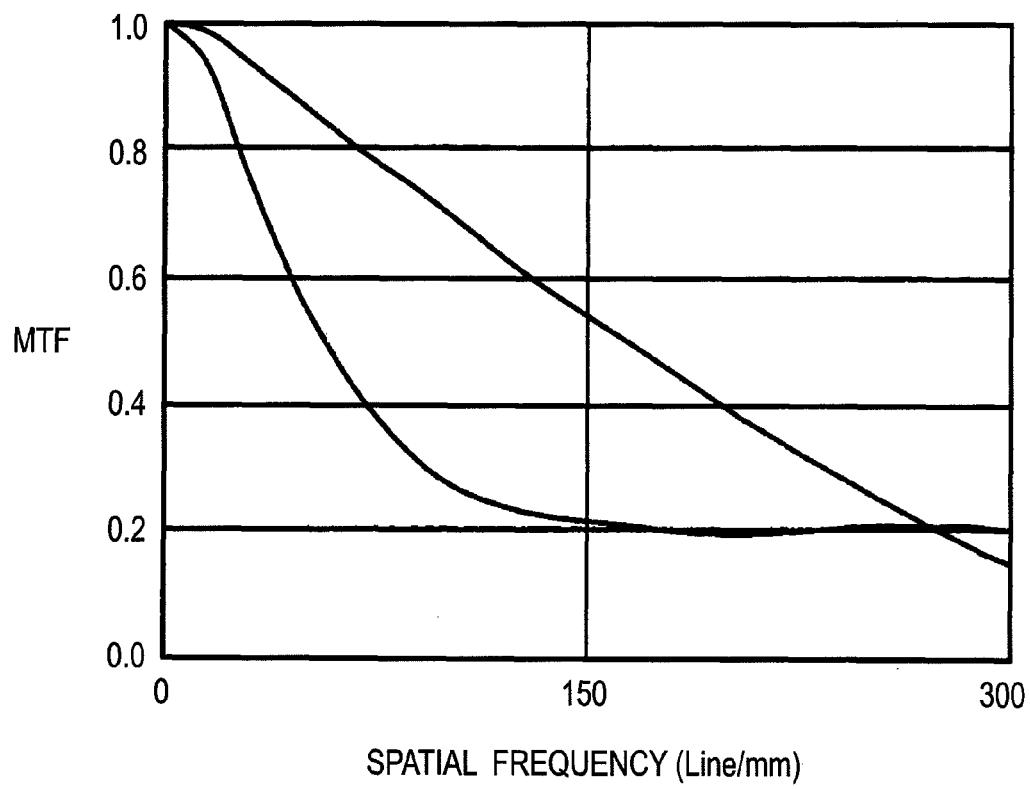
FIG. 8 shows one example of graph showing a relationship between phase differences of transparent wavefront and MTF of the embodiment of the present invention.

FIG. 8 shows a graph under F4.0, 1.0 AV and transmitted wavefront phase difference of 0.2 as the representative example of MTF data in case of changing the transmitted wavefront phase difference. In the graph, a horizontal axis thereof designates spatial frequency, while the vertical axis designates the degree of modulation at each spatial frequency.

If the transmitted wavefront phase difference is less than 0.2 µm, then the modulation becomes more than 15% at spatial frequencies less than 300 lp/mm as the practical spatial frequency, so that the feeling of resolving an image can be maintained generally.

While, in case of 0.3 µm in transmitted wavefront phase difference, the modulation becomes approx. 5% in the vicinity of 220 lp/mm at F2.8, 160 lp/mm at F4 and 110 lp/mm at F5.6, so that the feeling of resolving an image is lost.

From above, it is desirable that the transmitted wavefront phase difference is less than 0.2 µm (with a light beam having a wavelength of 0.55 µm).

The values of transmissivity in the light blocking area 254 of the ND filter 25 will be described.

When the transmissivity of the light blocking area 254 of the ND filter 25 is more than 30%, the ratio of transmitted intensity of the light intensity control device 23 becomes more than 30% under condition that the light blocking area 254 of the ND filter 25 covers the whole of the fixed opening 261. In order to reduce the ratio of transmitted intensity in such a state, it is necessary to provide the light blocking area 254 of the ND filter 25 with two kinds of concentration areas while increasing the size of the ND filter 25. Consequently, there occurs a problem that the ND filter 25 and a lens barrel of the lens part 2 are together large-sized to cause the imaging device itself to be enlarged.

Therefore, it is preferable to make the transmissivity of the ND filter 25 less than 30% and provide the light blocking area 254 of the ND filter 25 with only one concentration. Then, it is possible to prevent the lens barrel and the imaging device from being large sized.

Figure 9:
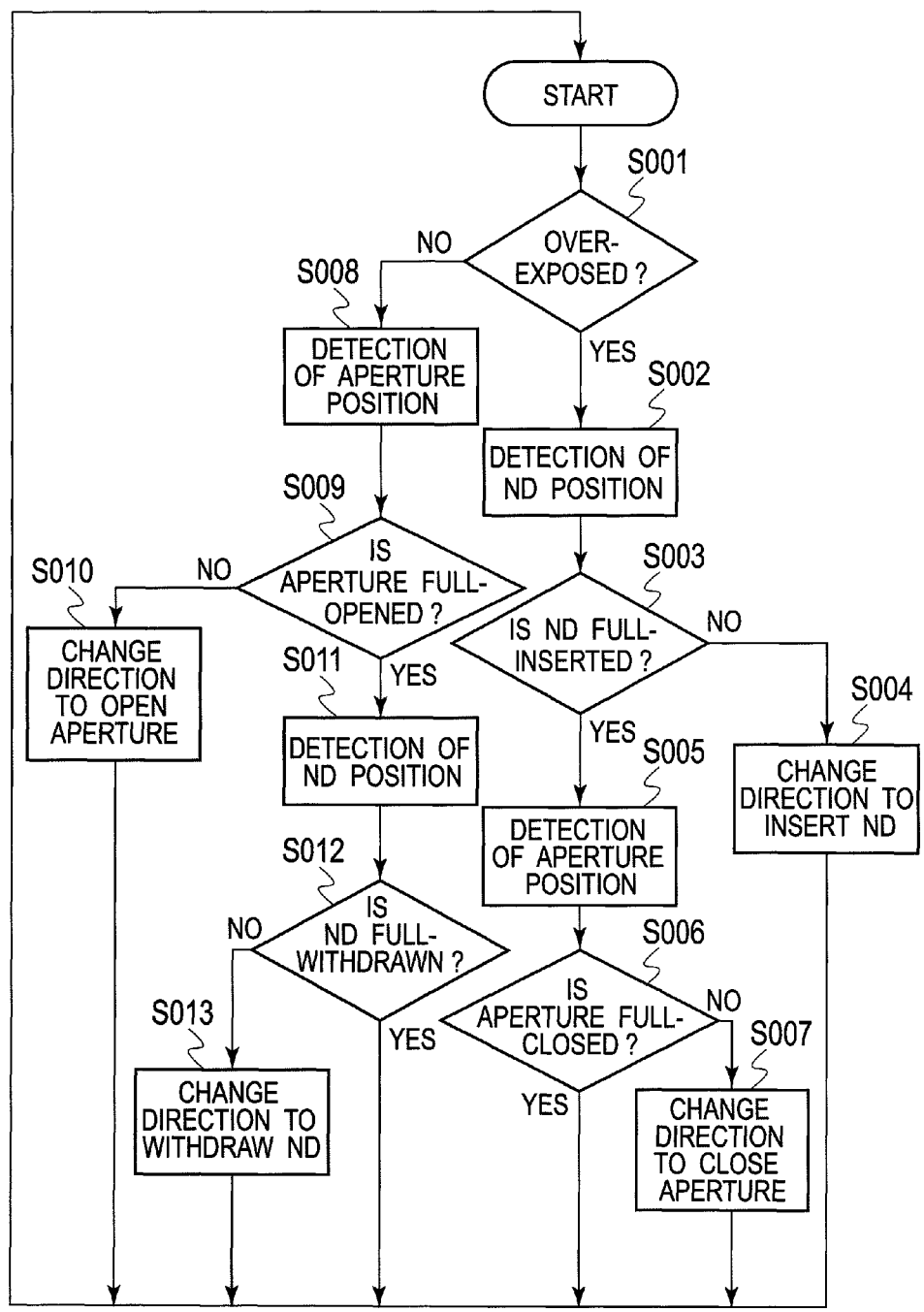
FIG. 9 is a control flow chart explaining the operation of an imaging device of the embodiment of the present invention.

Next, the operation of the imaging device 1 in practically taking a subject image will be described with reference to FIG. 9. FIG. 9 is a control flow chart explaining the operation of the imaging device.

When light corresponding to the subject image enters the pickup device 3, a detection signal is outputted from the pickup device 3, based on the incident light. Based on the detection signal from the pickup device 3, the picture signals and the luminance signal are outputted from the image processing circuit 43.

The luminance level of the luminance signal from the image processing circuit 43 is inputted to the microcomputer 44 and compared with the predetermined luminance level previously stored in the microcomputer 44 to judge an exposure state (step S001).

If it is judged that the luminance level of the luminance signal from the image processing circuit 43 is higher than the predetermined luminance level (Y, overexposure), then the microcomputer 44 detects the inserting condition of the ND filter 25 based on the ND position signal from the ND sensor 42 (step S002).

Based on the ND position signal detected at step S002, the microcomputer 44 judges whether the light blocking area 254 of the ND filter 25 in the actual position covers the fixed opening 261 of the aperture stop part 26 completely or not (step S003).

If it is judged at step S003 that the light blocking area 254 of the ND filter 25 in the actual position does not cover the fixed opening 261 of the aperture stop part 26 completely (N), then the microcomputer 44 drives the ND filter 25 with use of the ND driving unit 48 via the ND drive control circuit 47 and moves the ND filter in a direction to allow the light blocking area 254 to cover the fixed opening 261 completely (inserting direction) (step S004).

If it is judged at step S004 that the light blocking area 254 of the ND filter 25 in the actual position covers the fixed opening 261 of the aperture stop part 26 completely (Y), then the microcomputer 44 detects the opening/closing condition of the first aperture blade 241 and the second aperture blade 242 based on the aperture position signal from the aperture sensor 41 (step S005).

Based on the aperture position signal detected at step S005, the microcomputer 44 judges whether the first aperture blade 241 and the second aperture blade 242 are in their fully-close condition against the fixed opening 261 of the aperture stop part 242 at a maximum, or not (step S006).

If it is judged at step S006 that the first aperture blade 241 and the second aperture blade 242 are not closed totally (N), then the microcomputer 44 drives the first aperture blade 241 and the second aperture blade 242 with use of the aperture driving unit 46 via the aperture drive control circuit 45 so as to move the first aperture blade 241 and the second aperture blade 242 in directions to allow them to be closed at a maximum (closing directions) (step S004).

When it is judged at step S002 that the luminance level of the luminance signal from the image processing circuit 43 is lower than the predetermined luminance level (N, underexposure), then the microcomputer 44 detects the opening/closing state of the first aperture blade 241 and the second aperture blade 242, based on the aperture position signal from the aperture sensor 41 (step S008).

Based on the aperture position signal detected at step S008, the microcomputer 44 judges whether the first aperture blade 241 and the second aperture blade 242 are in their fully-open condition against the fixed opening 261 of the aperture stop part 242 at a maximum, or not (step S009).

If it is judged at step S009 that the first aperture blade 241 and the second aperture blade 242 are not opened totally (N), then the microcomputer 44 drives the first aperture blade 241 and the second aperture blade 242 with use of the aperture driving unit 46 via the aperture drive control circuit 45 so as to move the first aperture blade 241 and the second aperture blade 242 in directions to allow them to be opened at a maximum (opening directions) (step S010).

On the contrary, if it is judged at step S009 that the first aperture blade 241 and the second aperture blade 242 are full-opened against the aperture stop part 26 (Y), then the microcomputer 44 detects the inserting condition of the ND filter 25 based on the ND position signal from the ND sensor 42 (step S011).

Based on the ND position signal detected at step S011, the microcomputer 44 judges whether the transparent area 253 of the ND filter 25 in the actual position covers the fixed opening 261 of the aperture stop part 26 completely, or not (step S012).

If it is judged at step S012 that the transparent area 253 of the ND filter 25 in the actual position does not cover the fixed opening 261 of the aperture stop part 26 completely (N), then the microcomputer 44 drives the ND filter 25 with use of the ND driving unit 48 via the ND drive control circuit 47 so as to move the ND filter 25 in a direction to allow the transparent area 253 to cover the fixed opening 261 completely (withdrawal direction) (step S013).

Thus, by controlling the operations of the ND filter 25, the first aperture blade 241 and the second aperture blade 242 on the ground of the luminance level of the luminance signal from the image processing circuit 43, the ND position signal from the ND sensor 42 and the aperture position signal from the aperture sensor 41, it is possible to realize an optimal exposure condition on the pickup device 3.

According to the embodiment, it is possible to restrain a deterioration of resolution due to a transmitted wavefront phase difference in inserting the ND filter 25, allowing the light intensity to be controlled continuously. Further, it is possible to avoid aperture step-down, which may lead to a projection of scratches or particles, which are adhered to a cover glass for the package of the pickup device 3 and an optical low-pass filter just ahead of the package of the pickup device 3, onto a taken image.

Note that if the ND filter is provided, between the light blocking area 254 and the transparent area 253, with a boundary area whose transmitted wavefront phase difference against either of the two areas exceeds 0.2 μm at the light beam of 0.55 μm, the phase difference of light beam transmitted through the boundary area becomes a wavefront aberration to cause a deterioration of resolution. However, if the aperture of an opening at that time has an area less than 10% of the whole opening area (i.e. size of the fixed opening), there would be less influenced on the deterioration of resolution, allowing the resultant filter to be sustainable for practical use.

Although the light intensity control device 23 has the light intensity aperture part 24, the ND filter 25 and the aperture stop part 26 arranged in this order from the side of the first lens unit 21 in the illustrated embodiment, the arrangement is not necessarily limited to the above order. Thus, any arrangement sequence of these elements would be adopted as long as they are arranged close to each other.

In addition, although this embodiment has been described with an example where the position sensor detects the positions of the light intensity aperture part 23 and the ND filter 25, it goes without saying that the detecting of such positions may be attained since an encoder or the like monitors a feeding span of a driving unit.

REFERENCE SIGNS

1 . . . Imaging Unit
2 . . . Lens Part
3 . . . Pickup Device
4 . . . Control Unit
21 . . . First Lens Unit
22 . . . Second Lens Unit
23 . . . Light Intensity Control Device
24 . . . Light Intensity Aperture Part
25 . . . Light Extinction (ND) filter (Light Extinction Part)
26 . . . Aperture Stop Part
41 . . . Aperture Sensor
42 . . . ND sensor
43 . . . Image Processing Circuit
45 . . . Aperture Drive Control Unit
46 . . . Aperture Driving Unit
47 . . . ND Drive Control Unit
48 . . . ND Driving Unit
241 . . . First Aperture Blade
242 . . . Second Aperture Blade
251 . . . Transparent Substrate
252 . . . Light Blocking Film
253 . . . Transparent Area (First Area)
254 . . . Light Blocking Area (Second Area)
261 . . . Circular Hole (Fixed Opening)

What is claimed is:

1. A light intensity control device comprising:
an aperture stop part provided with an opening part having a of first opening area thereby controlling flux of incident light to a predetermined size;
a light extinction part having a first area whose transmissivity for the incident light is more than a first value and a second area whose transmissivity for the incident light is a second value smaller than the first value, the light extinction part being adapted to be movable between its first blocking state where the first area covers the opening part completely and a second light blocking state a second light blocking state where the second area covers the opening part completely; and
a light intensity aperture part having a plurality of movable aperture blades to further limit a light intensity of light transmitted through the opening part by moving the plurality of aperture blades so that the size of an opening defined by the aperture blades against the opening part is changed from the first opening area to a second opening area smaller than the first opening area,
wherein:
the moving of the light extinction part and the moving of the plurality of aperture blades are carried out independently of each other,
the light extinction part is movable between the first light blocking state and the second light blocking state under a condition that the size of the opening defined by the aperture blades is equal to or larger than the size of the opening part, and
the plurality of aperture blades are movable under a condition that the light extinction part has the second light blocking state.

2. The light intensity control device of claim 1, wherein a phase difference of transmission wavefront between light transmitted through the first area and light transmitted through the second area is less than 0.2 μm with a wavelength of 0.55 μm.

3. An imaging device comprising:
a pickup device configured to convert incident light to an electrical signal when light corresponding to a subject image enters the pickup device and output the electrical signal as a detection signal;
a lens part consisting of a plurality of lenses to form the subject image on the pickup device;
the light intensity control device of claim 1 interposed in the plurality of lenses of the lens part; and
a control unit for controlling the light extinction part and the light intensity aperture part of the light intensity control device independently of each other, based on the detection signal outputted from the pickup device.

4. A light intensity control method comprising:
a light extinction part moving step of moving a light extinction part including a light blocking area having a predetermined transmissivity in a direction to allow the light blocking area to cover an opening part having a first opening area in an aperture stop part completely, thereby limiting light intensity of light transmitted through the opening part; and
an aperture blade moving step of moving a plurality of aperture blades under a condition that the opening part is covered with the light blocking area completely so as to change the size of an opening against the opening part from the first opening area to a second opening area smaller than the first opening area, thereby further limiting the light intensity of the light transmitted through the opening part,
wherein
the light extinction part has a first area whose transmissivity for an incident light is more than a first value and a second area whose transmissivity for an incident light is a second value smaller than the first value,
in the light extinction part moving step, moving the light extinction part between a first light blocking state where the first area covers the opening part completely and a second light blocking state where the second area covers the opening part completely, under a condition that the size of the opening defined by the aperture blades is equal to or larger than the size of the opening part, and
in the aperture blade moving step, moving the plurality of aperture blades under a condition that the light extinction part has the second light blocking state.

* * * * *

UNITED STATES PATENT AND TRADEMARK OFFICE
CERTIFICATE OF CORRECTION

PATENT NO. : 8,934,031 B2
APPLICATION NO. : 13/318026
DATED : January 13, 2015
INVENTOR(S) : Fumio Nidaira et al.

It is certified that error appears in the above-identified patent and that said Letters Patent is hereby corrected as shown below:

In the Claims

Claim 1, Column 11, Line 4: Between "a" and "First Opening" please delete "of"
Claim 1, Column 11, Line 15: After "a plurality of" please delete "movable"

Signed and Sealed this
Fourteenth Day of April, 2015

Michelle K. Lee
*Director of the United States Patent and Trademark Office*